July 25, 1950
F. J. WRIGHT
2,516,821
MECHANISM FOR DRIVING SHAFTS AT
EQUAL OR UNEQUAL SPEEDS
Filed June 17, 1947
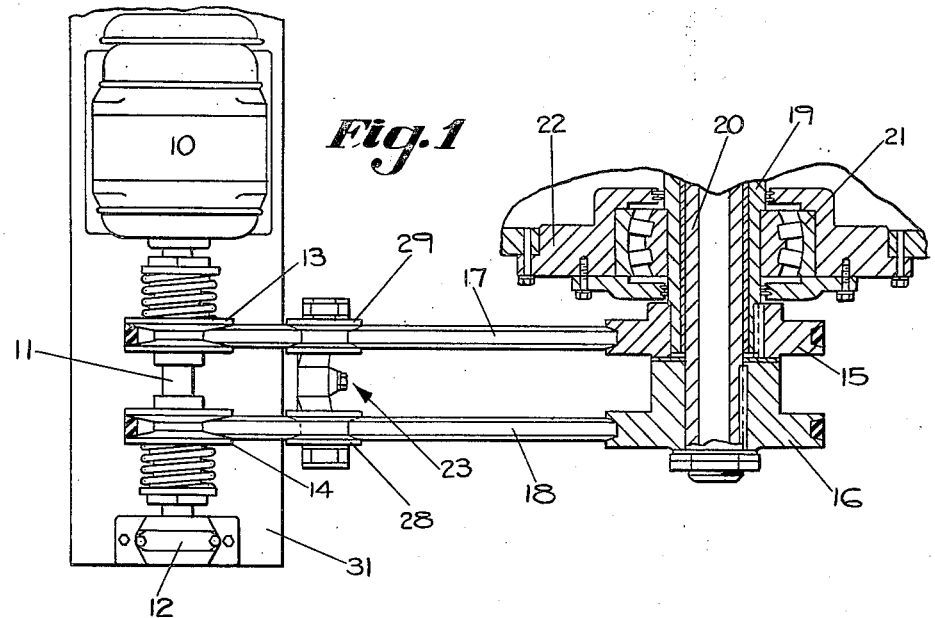
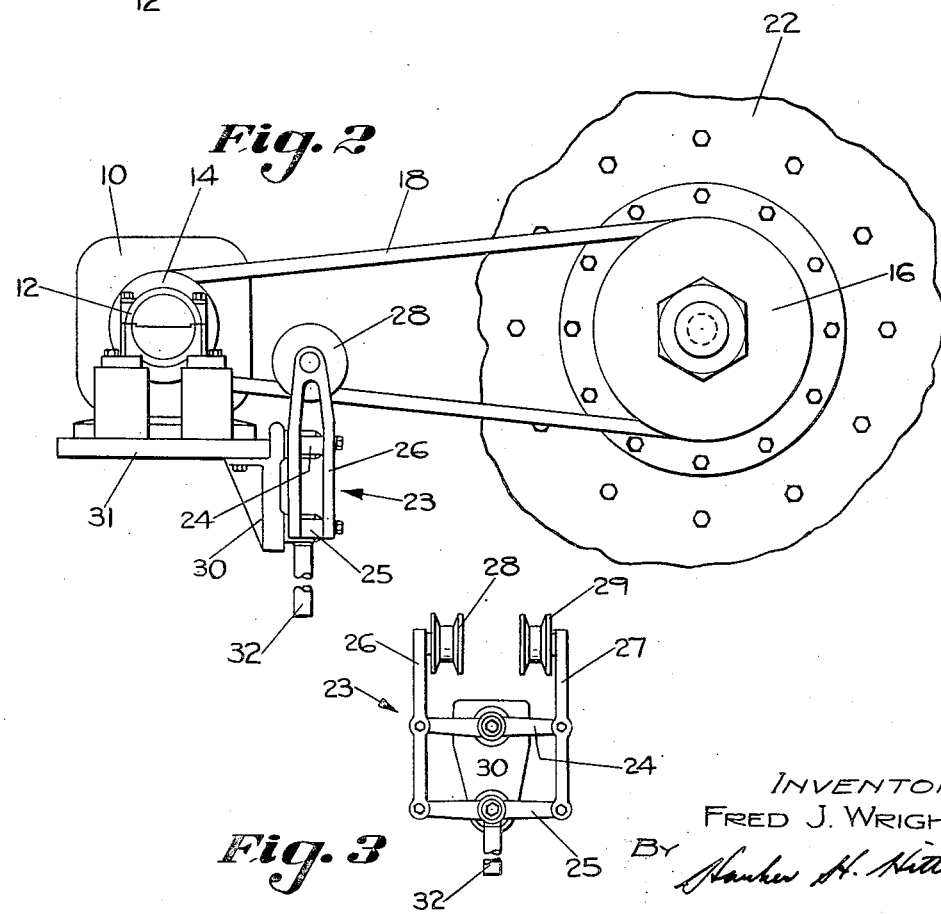
INVENTOR;
FRED J. WRIGHT,
BY
ATT'Y.

Patented July 25, 1950

2,516,821

UNITED STATES PATENT OFFICE 2,516,821

MECHANISM FOR DRIVING SHAFTS AT EQUAL OR UNEQUAL SPEEDS

Fred J. Wright, Columbus, Ohio, assignor to The Jeffrey Manufacturing Company, a corporation of Ohio Application June 17, 1947, Serial No. 755,048

2 Claims. (Cl. 74—230.17)

This invention relates to improved apparatus for driving a pair of shafts at equal or synchronous speeds or at unequal or assynchronous speeds.

An object of the invention therefore is to provide improved mechanism of the above type which is very simple in operation and which may be readily adjusted to produce the desired results.

Other objects of the invention will appear hereinafter, the novel features and combinations being set forth in the appended claims.

In the accompanying drawings,

Fig. 1 is a plan view of my improved drive;

Fig. 2 is a side elevational view thereof; and

Fig. 3 is a front view of the drive shifting mechanism.

A motor 10 is provided which drives a shaft 11 which preferably constitutes an extension of the motor shaft and may be supported at its outer end on a self-aligning bearing 12. Mounted on the shaft 11 is a pair of driving spring-loaded pulleys 13 and 14 which drive driven pulleys 15 and 16, respectively, through V-belts 17 and 18, respectively. Driven pulleys 15 and 16 are keyed to concentric shafts 19 and 20, respectively, which may be mounted in bearings, one of which is seen at 21, said bearing 21 being supported in a suitable frame, casing, or the like, 22.

The pulleys 13 and 14 are preferably of the same diameter and normally of the same effective diameter, and pulleys 15 and 16 are also preferably of the same diameter. Consequently, under normal conditions of drive, shafts 19 and 20 will rotate in synchronism. To provide for their temporary asynchronism so as to adjust their phase relation I provide phase shifting mechanism 23 which is in the form of a parallel motion mechanism having centrally pivoted transverse arms 24, 25 interconnected by upright pivotally attached arms 26, 27 provided with idler rollers 28 and 29, respectively. Arms 24 and 25 are pivotally mounted on a bracket 30 which is supported from a base 31 which acts as a base for the motor 10 and the bearing 12.

Lower arm 25 is provided with a downwardly extending lever or handle 32 to operate the phase shifting mechanism 23. It is obvious that by operating the handle 32, one of the pulleys 28 may be selectively raised or lowered while the other moves in reverse direction.

The phase shifting mechanism 23 may be so adjusted with respect to the belts 17 and 18 as to preload them or to preload the pulleys 13 and 14. This, of course, is effected by said pulleys 28 and 29 deflecting the lower run fo the V-belt with which it is associated. On the other hand, this preloading need not be employed, in which case the idlers 28 and 29 normally do not deflect the associated belts.

Under normal conditions the shafts 19 and 20 will be driven in synchronism, but if one of the belts 17 or 18 is deflected, the effective diameter of the associated drive pulley 13 or 14 would be reduced, thereby producing asynchronous rotation of the shafts 19 and 20, or, in other words, shifting their phase relation. If the phase shifting mechanism 23 preloads the pulleys 13 and 14, operation of the handle 32 will automatically decrease the effective diameter of one of the pulleys 13, 14 while simultaneously increasing the effective diameter of the other, thus providing greater differential movement of the shafts 19 and 20 by the same adjustment of the handle 32.

The phase shifting mechanism 23 also acts as as equalizer when it is in a preloaded adjustment, thereby tending to keep said shafts 19 and 20 rotating in synchronism.

It is obvious from the above that a simple but very effective drive mechanism has been provided which will normally drive two shafts in synchronism, but which may be temporarily adjusted to change their phase relation or to drive them in asynchronism.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. Adjustable drive mechanism including a pair of driven concentric shafts, means normally driving said shafts in synchronism including separate equi-diameter pulleys on said shafts, normal equi-diameter motor operated drive pulleys, one for each of said pair of driven pulleys, some of said pulleys being spring loaded and adjustable in effective diameter in response to belt tension, a belt between each drive pulley and a driven pulley, means for adjusting the tension of said belts to produce a phase shift between said shafts while rotating, said tension adjusting means including a pair of idler rollers, one for each belt, and parallel motion mechanism mounting said idlers including a pair of spaced arms pivoted intermediate their ends and roller holding arms attached to said pivoted arms on opposite sides of their pivots whereby said roller holding arms and idler rollers move in opposite directions when adjusted, said idlers being positioned normally to deflect both of said belts thereby preloading them.

2. Adjustable drive mechanism including a pair of driven concentric shafts, means normally driving said shafts in synchronism including separate pulleys on said shafts, motor operated drive pulleys, one for each of said pair of driven pulleys, some of said pulleys being spring loaded and adjustable in effective diameter in response to belt tension, a belt between each drive pulley and a driven pulley, means for adjusting the tension of said belts to produce a phase shift between said shafts while rotating, said tension adjusting means including a pair of idler rollers, one for each belt, and parallel motion mechanism mounting said idlers including a pair of spaced arms pivoted intermediate their ends and roller holding arms attached to said pivoted arms on opposite sides of said pivots whereby said roller holding arms and idler rollers move in opposite directions when adjusted.

FRED J. WRIGHT.

REFERENCES CITED

The following references are of record in the file of this patent:

UNITED STATES PATENTS

| Number | Name | Date |
| --- | --- | --- |
| 2,047,840 | Twomley | July 14, 1936 |
| 2,134,159 | Van Hofe | Oct. 25, 1938 |
| 2,179,933 | Heyer | Nov. 14, 1939 |
| 2,445,175 | Hittson | July 13, 1948 |